United States Patent
Dinica et al.

(10) Patent No.: US 11,604,627 B2
(45) Date of Patent: Mar. 14, 2023

(54) SYSTEMS AND METHODS FOR ON-DEMAND PROVISIONING OF ROBOTIC PROCESS AUTOMATION ENVIRONMENTS

(71) Applicant: UiPath Inc., New York, NY (US)

(72) Inventors: Ion Dinica, Otopeni (RO); Teofil Harapcea, Buchare (RO); Bogdan Nedelcov, Buchare (RO); Adrian Tudoran, Buchare (RO); George Dumitrascu, Buchare (RO); Liviu Stancu, Buchare (RO)

(73) Assignee: UiPath Inc., New York, NY (US)

( * ) Notice: Subject to any disclaimer, the term of this patent is extended or adjusted under 35 U.S.C. 154(b) by 313 days.

(21) Appl. No.: 16/868,839

(22) Filed: May 7, 2020

(65) Prior Publication Data
US 2021/0347062 A1  Nov. 11, 2021

(51) Int. Cl.
*G06F 8/36* (2018.01)
*B25J 13/00* (2006.01)
(Continued)

(52) U.S. Cl.
CPC .............. *G06F 8/36* (2013.01); *B25J 13/006* (2013.01); *G05B 19/4155* (2013.01); *G06F 9/45558* (2013.01); *G05B 2219/39371* (2013.01)

(58) Field of Classification Search
CPC ............... B25J 13/006; G05B 19/4155; G05B 2219/39371; G06F 9/45558; G06F 9/45533; G06F 8/71; G06F 8/36
See application file for complete search history.

(56) References Cited

U.S. PATENT DOCUMENTS 8,793,684 B2  7/2014  Breitgand et al.
8,997,093 B2 * 3/2015  Dimitrov ............ G06F 9/45558
                                                         718/1
(Continued)

FOREIGN PATENT DOCUMENTS

WO  WO-2020223365 A1 * 11/2020 .............. B25J 9/163

OTHER PUBLICATIONS digitalexchange.blueprism.com, "Blue Prism Azure Trial", https://digitalexchange.blueprism.com/dx/entry/3439/solution/blue-prism-on-azure-marketplace, downloaded on Apr. 16, 2020.
(Continued)

*Primary Examiner* — Santosh R Poudel
(74) *Attorney, Agent, or Firm* — Law Office of Andrei D Popovici, PC

(57) ABSTRACT

Some embodiments provide a user-friendly interface enabling a non-technical user to automatically provision a robotic process automation (RPA) environment on a target computing system such as a cloud computing platform or an on-premises server. The provisioned environment may include all necessary components (e.g., virtual machines, robots, robot orchestrator, databases, network links) to execute a robotic task. The provisioned environment is terminated automatically after or at a time specified by the user. The described systems and methods are particularly useful at trade shows or other events, in order to simplify and speed up the demonstration of RPA software capabilities to different customers planning RPA software deployment in different contexts, including on different cloud platforms or hybrid contexts combining cloud with on-premises host platforms.

29 Claims, 9 Drawing Sheets

(51) Int. Cl.
*G05B 19/4155* (2006.01)
*G06F 9/455* (2018.01)

(56) References Cited

U.S. PATENT DOCUMENTS

| | | | |
|---|---|---|---|
| 10,248,445 B2 | 4/2019 | Khandekar et al. | |
| 2009/0293056 A1* | 11/2009 | Ferris | G06F 9/45554 718/1 |
| 2014/0229939 A1* | 8/2014 | Dias de Assuncao | G06F 8/65 718/1 |
| 2014/0279581 A1* | 9/2014 | Devereaux | G06Q 50/184 718/1 |
| 2015/0213106 A1* | 7/2015 | Kunde | G06F 16/282 718/1 |
| 2018/0089698 A1 | 3/2018 | Campana et al. | |
| 2018/0189093 A1 | 7/2018 | Agarwal et al. | |
| 2019/0126463 A1* | 5/2019 | Purushothaman | G06Q 10/04 |
| 2020/0134374 A1* | 4/2020 | Oros | G06F 8/65 |

OTHER PUBLICATIONS quali.com, "CloudShell Pro Overview", https://info.quali.com/hubfs/CloudShell%20Pro%20Datasheet.pdf, downloaded on Apr. 16, 2020.

quali.com, "Quali Joins Google Cloud Partnership Ecosystem", https://www.prweb.com/releases/quali_joins_google_cloud_partnership_ecosystem/prweb16749139.htm, Dec. 10, 2019.

virsoft.net, "Virsoft Solution Demo as a Service", screen shots from video posted on https://www.youtube.com/watch?v=ISfwkgKQ9z4, Aug. 30, 2012.

virsoft.net, "Demo as a Service", https://virsoft.sharepoint.com/Documents/Virsoft%20Datasheet%20for%20web.pdf, downloaded on Apr. 16, 2020.

\* cited by examiner

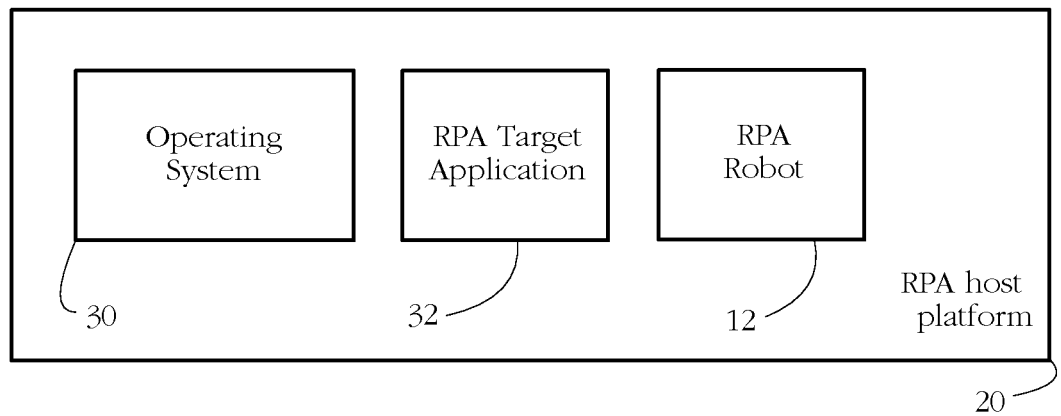
FIG. 4-A
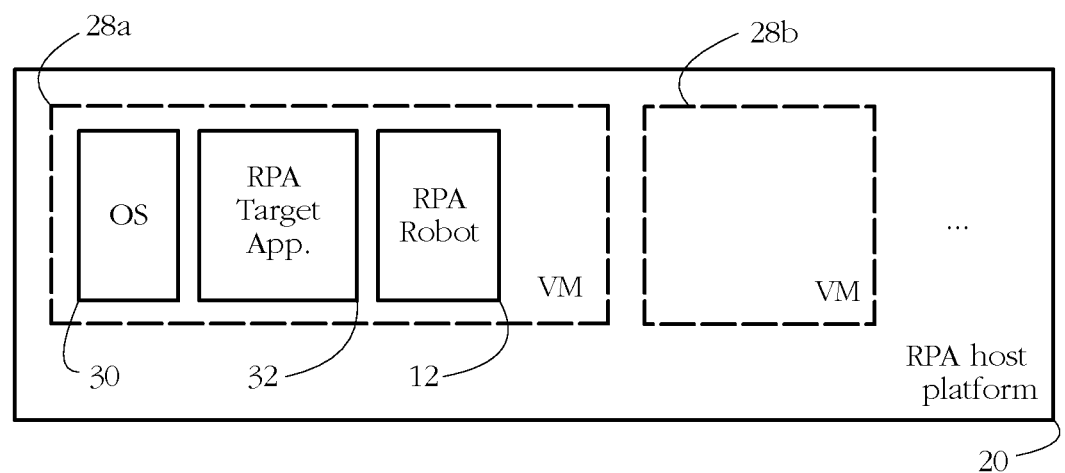
FIG. 4-B

SYSTEMS AND METHODS FOR ON-DEMAND PROVISIONING OF ROBOTIC PROCESS AUTOMATION ENVIRONMENTS

BACKGROUND

The invention relates to robotic process automation (RPA), and in particular to systems and methods for automatic on-demand provisioning of a fully functional RPA environment.

RPA is an emerging field of information technology aimed at improving productivity by automating repetitive computing tasks, thus freeing human operators to perform more intellectually sophisticated and/or creative activities. Notable tasks targeted for automation include, among others, extracting structured data from documents, form filling, generating complex reports, and transferring data among various software applications which are not specifically configured to communicate with each other.

A distinct prong of RPA development is directed at simplifying the programming, management, and deployment of software robots, with the ultimate goal of extending the reach of RPA technology to users that lack advanced programming skills or training. One way of making RPA more accessible is the development of RPA-oriented integrated development environments (IDEs) which allow the programming of robots via graphical user interface (GUI) tools, instead of coding per se. There is a strong interest in making such GUI tools as intuitive and user-friendly as possible, to attract a broad audience of developers.

SUMMARY

According to one aspect, a method comprises employing at least one hardware processor of a computer system, in response to exposing a user interface to a user, to receive a user input indicating a selected robotic process automation (RPA) environment template and a user input indicating a desired provisioning lifespan, wherein the user interface presents to the user for selection a plurality of pre-defined platform-specific RPA environment templates. The method further comprises employing the at least one hardware processor, in response to receiving the user inputs indicating the selected RPA environment template and provisioning lifespan, to initiate an automatic provisioning of an RPA environment to a host platform. The RPA environment is configured according to the selected RPA environment template and comprises a virtual machine (VM) and a platform-specific service used by the VM. The VM is configured to execute an RPA robot mimicking an interaction between a human operator and a target software application. The method further comprises employing the at least one hardware processor, in response to determining that the provisioning lifespan has expired, to initiate a de-activation of the RPA environment.

According to another aspect, a computer system comprises at least one hardware processor configured, in response to exposing a user interface to a user, to receive a user input indicating a selected robotic process automation (RPA) environment template and a user input indicating a desired provisioning lifespan, wherein the user interface presents to the user for selection a plurality of pre-defined platform-specific RPA environment templates. The at least one hardware processor is further configured, in response to receiving the user inputs indicating the selected RPA environment template and provisioning lifespan, to initiate an automatic provisioning of an RPA environment to a host platform. The RPA environment is configured according to the selected RPA environment template and comprises a virtual machine (VM) and a platform-specific service used by the VM. The VM is configured to execute an RPA robot mimicking an interaction between a human operator and a target software application. The at least one hardware processor is further configured, in response to determining that the provisioning lifespan has expired, to initiate a de-activation of the RPA environment.

According to another aspect, a non-transitory computer-readable medium stores instructions which, when executed by at least one hardware processor of a computer system, cause the computer system, in response to exposing a user interface to a user, to receive a user input indicating a selected robotic process automation (RPA) environment template and a user input indicating a desired provisioning lifespan, wherein the user interface presents to the user for selection a plurality of pre-defined platform-specific RPA environment templates. The instructions further cause the computer system, in response to receiving the user inputs indicating the selected RPA environment template and provisioning lifespan, to initiate an automatic provisioning of an RPA environment to a host platform. The RPA environment is configured according to the selected RPA environment template and comprises a virtual machine (VM) and a platform-specific service used by the VM. The VM is configured to execute an RPA robot mimicking an interaction between a human operator and a target software application. The instructions further cause the computer system, in response to determining that the provisioning lifespan has expired, to initiate a de-activation of the RPA environment.

BRIEF DESCRIPTION OF THE DRAWINGS

The foregoing aspects and advantages of the present invention will become better understood upon reading the following detailed description and upon reference to the drawings where:

FIG. 4-A shows exemplary RPA components executing on an RPA host platform according to some embodiments of the present invention.

FIG. 4-B shows exemplary RPA components executing within a virtual machine exposed on an RPA host platform according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
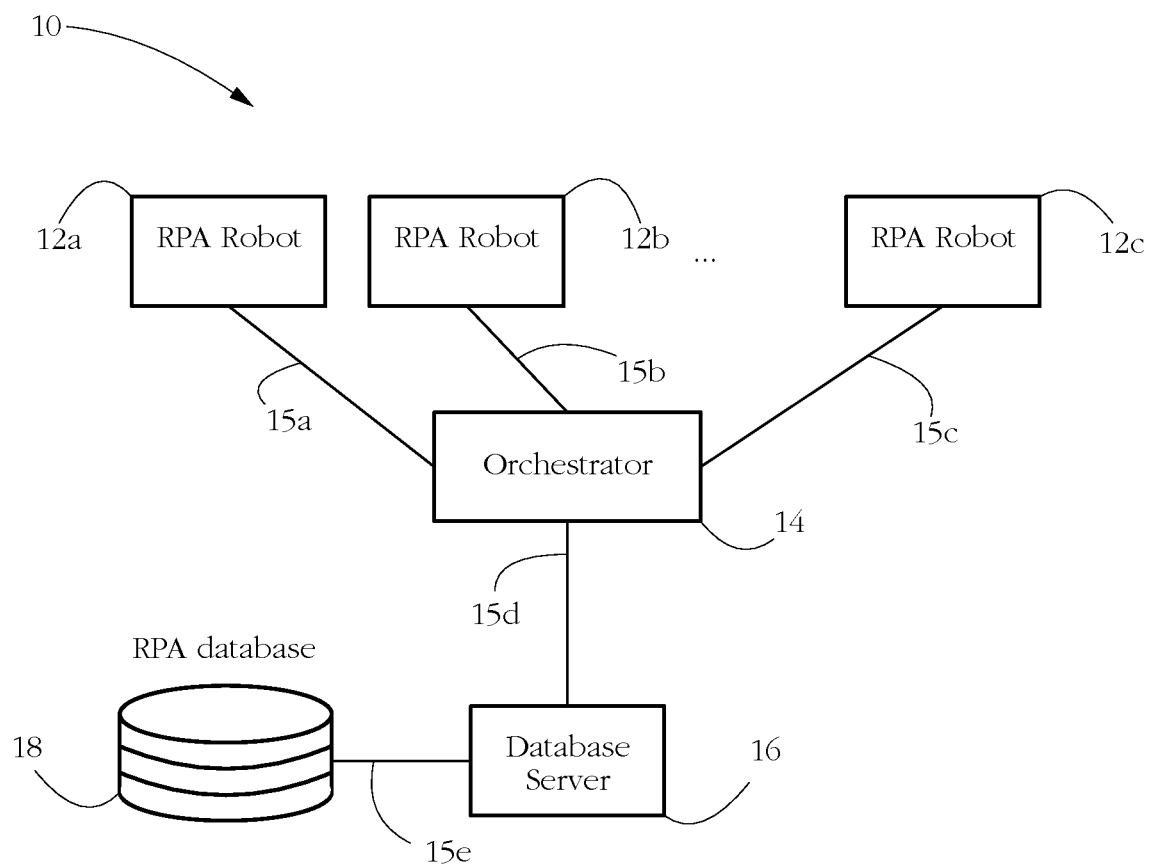
FIG. 1 shows an exemplary robotic process automation (RPA) environment according to some embodiments of the present invention.

FIG. 1 shows an exemplary robotic process automation (RPA) environment 10 according to some embodiments of the present invention. Environment 10 comprises various software components which collaborate to achieve the automation of a particular task. In an exemplary RPA scenario, an employee of a company uses a business application (e.g., word processor, spreadsheet editor, browser, email application) to perform a repetitive task, for instance to issue invoices to various clients. To actually carry out the respective task, the employee performs a sequence of operations/actions, which is herein deemed a business process. Exemplary operations forming a part of an invoice-issuing business process may include opening a Microsoft Excel® spreadsheet, looking up company details of a client, copying the respective details into an invoice template, filling out invoice fields indicating the purchased items, switching over to an email application, composing an email message to the respective client, attaching the newly created invoice to the respective email message, and clicking a 'Send' button.

Various elements of RPA environment 10 may automate the respective business process by mimicking the set of operations performed by the respective human operator in the course of carrying out the respective task.

Mimicking a human operation/action is herein understood to encompass reproducing the sequence of computing events that occur when a human operator performs the respective operation/action on the computer, as well as reproducing a result of the human operator's performing the respective operation on the computer. For instance, mimicking an action of clicking a button of a graphical user interface may comprise having the operating system move the mouse pointer to the respective button and generating a mouse click event, or may alternatively comprise toggling the respective GUI button itself to a clicked state.

Processes typically targeted for such automation include processing of payments, invoicing, communicating with business clients (e.g., distribution of newsletters and/or product offerings), internal communication (e.g., memos, scheduling of meetings and/or tasks), auditing, and payroll processing, among others. In some embodiments, a dedicated RPA design application 34 (FIG. 2) enables a human developer to design a software robot to implement workflows that effectively automate business processes by giving the developer control of the execution order and the relationship between a custom set of automation steps developed in a workflow, steps herein deemed "activities." Each activity may include an action, such as clicking a button, reading a file, writing to a spreadsheet cell, etc. In some embodiments, workflows may be nested or embedded. One commercial example of an embodiment of such RPA design software is UiPath Studio™.

Some types of workflows may include, but are not limited to, sequences, flowcharts, finite state machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Figure 2:
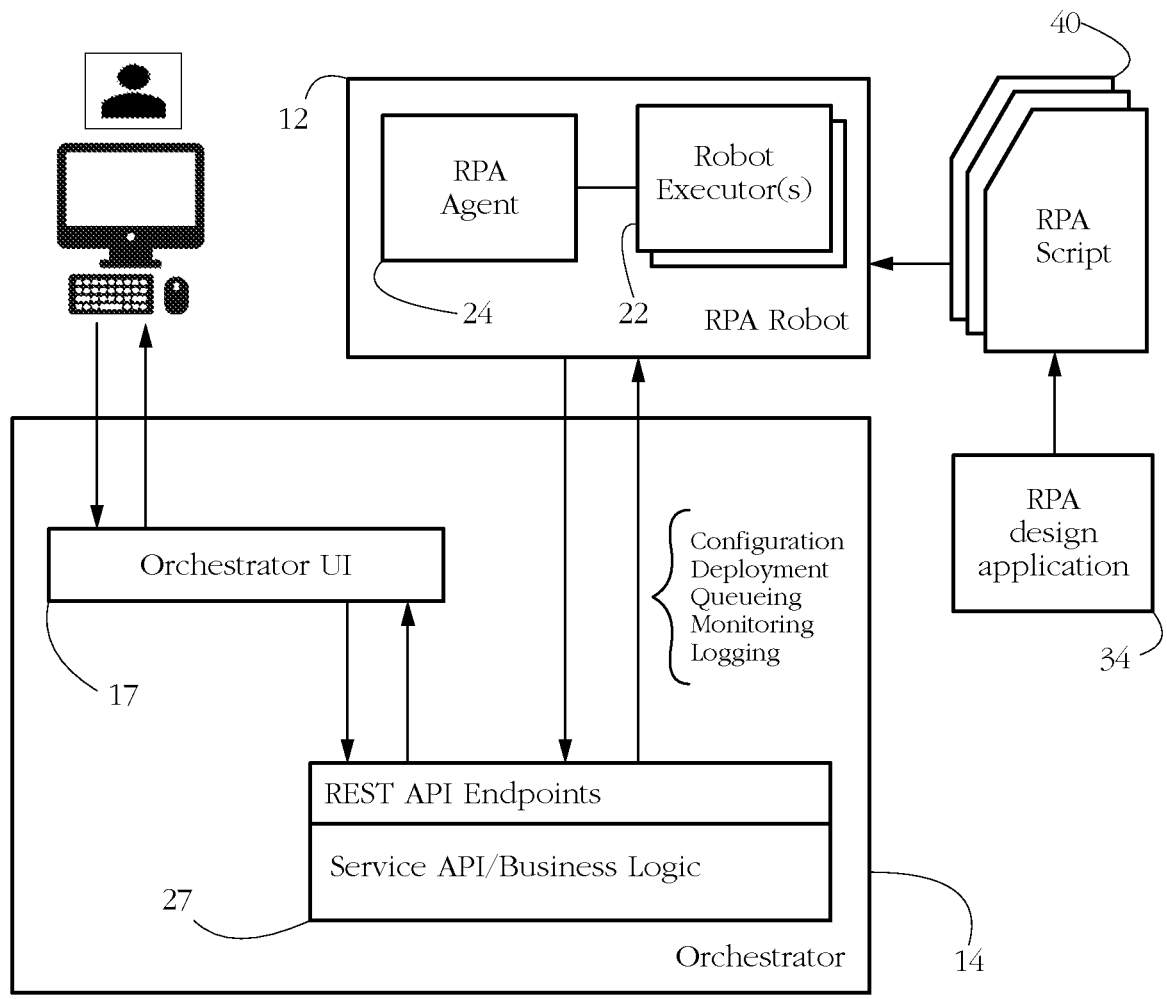
FIG. 2 illustrates exemplary components and operation of an RPA robot and orchestrator according to some embodiments of the present invention.

Once a workflow is developed, it may be encoded in computer-readable form as a set of RPA scripts 40 (FIG. 2). RPA scripts 40 may be formulated according to any data specification known in the art, for instance in a version of an extensible markup language (XML), or a programming language such as C #, Visual Basic, Java, etc. Alternatively, RPA scripts 40 may be formulated in an RPA-specific version of bytecode, or even as a sequence of instructions formulated in a natural language such as English, Spanish, Japanese, etc. In some embodiments, scripts 40 are pre-compiled into a set of native processor instructions (e.g., machine code).

Scripts 40 may then be executed by a set of robots 12a-c (FIG. 1), which may be further controlled and coordinated by an orchestrator 14. Robots 12a-c and orchestrator 14 may each comprise a plurality of computer programs, which may or may not execute on the same physical machine. Exemplary commercial embodiments of robots 12a-c and orchestrator 14 include UiPath Robots™ and UiPath Orchestrator™, respectively. Types of robots 12a-c include, but are not limited to, attended robots, unattended robots, development robots (similar to unattended robots, but used for development and testing purposes), and nonproduction robots (similar to attended robots, but used for development and testing purposes).

Attended robots are triggered by user events and/or commands and operate alongside a human operator on the same computing system. In some embodiments, attended robots can only be started from a robot tray or from a command prompt and thus cannot be controlled from orchestrator 14 and cannot run under a locked screen, for example. Unattended robots may run unattended in remote virtual environments and may be responsible for remote execution, monitoring, scheduling, and providing support for work queues.

Orchestrator 14 may have various capabilities including, but not limited to, provisioning, deployment, configuration, queueing, monitoring, logging, and/or providing interconnectivity for robots 12a-c. Provisioning may include creating and maintaining connections between robots 12a-c and orchestrator 14. Deployment may include ensuring the correct delivery of software (e.g, RPA scripts 40) to robots 12a-c for execution. Configuration may include maintenance and delivery of robot environments and workflow configurations. Queueing may include providing management of queues and queue items. Monitoring may include keeping track of robot state and maintaining user permissions. Logging may include storing and indexing logs to a database and/or another storage mechanism (e.g., SQL, ElasticSearch™, Redis™) Orchestrator 14 may further act as a centralized point of communication for third-party solutions and/or applications.

FIG. 2 shows exemplary components of a robot 12 and orchestrator 14 according to some embodiments of the present invention. An exemplary RPA robot is constructed using a Windows™ Workflow Foundation Application Programming Interface from Microsoft®, Inc. Robot 12 may comprise a set of executors 22 and an RPA agent 24. Robot executors 22 are configured to receive RPA script 40 indicating a sequence of activities that mimic the actions of a human operator carrying out a business process, and to actually execute the respective sequence of activities on the respective client machine. In some embodiments, robot executor(s) 22 comprise an interpreter (e.g., a just-in-time interpreter or compiler) configured to translate RPA script 40 into a runtime package comprising processor instructions for carrying out the operations described in the respective script. Executing script 40 may thus comprise executor(s) 22 translating RPA script 40 and instructing a processor of the respective host machine to load the resulting runtime package into memory and to launch the runtime package into execution.

RPA agent 24 may manage the operation of robot executor(s) 22. For instance, RPA agent 24 may select tasks/scripts for execution by robot executor(s) 22 according to an input from a human operator and/or according to a schedule. Agent 24 may start and stop jobs and configure various operational parameters of executor(s) 22. When robot 12 includes multiple executors 22, agent 24 may coordinate their activities and/or inter-process communication. RPA agent 24 may further manage communication between RPA robot 12 and orchestrator 14 and/or other entities.

In some embodiments executing in a Windows™ environment, robot 12 installs a Microsoft Windows™ Service Control Manager (SCM)-managed service by default. As a result, such robots can open interactive Windows™ sessions under the local system account and have the processor privilege of a Windows™ service. For instance, a console application may be launched by a SCM-managed robot. In some embodiments, robot 12 can be installed at a user level of processor privilege (user mode, ring 3.) Such a robot has the same rights as the user under which the respective robot has been installed. For instance, such a robot may launch any application that the respective user can. On computing systems that support multiple interactive sessions running simultaneously (e.g., Windows™ Server 2012), multiple robots may be running at the same time, each in a separate Windows™ session, using different usernames.

In some embodiments, robot 12 and orchestrator 14 may execute in a client-server configuration. It should be noted that the client side, the server side, or both, may include any desired number of computing systems (e.g., physical or virtual machines) without deviating from the scope of the invention. In such configurations, robot 12 including executor(s) 22 and RPA agent 24 may execute on a client side. Robot 12 may run several workflows concurrently. RPA agent 24 (e.g., a Windows™ service) may act as a single client-side point of contact of executors 22. Agent 24 may further manage communication between robot 12 and orchestrator 14. In some embodiments, communication is initiated by agent 24, which may open a WebSocket channel to orchestrator 14. Agent 24 may subsequently use the channel to transmit notifications regarding the state of each executor 22 to orchestrator 14. In turn, orchestrator 14 may use the channel to transmit acknowledgements, job requests, and other data such as RPA scripts 40 to robot 12.

Orchestrator 14 may execute on a server side, possibly distributed over multiple physical machines. In one such embodiment, orchestrator 14 may include an orchestrator UI 17 which may be a web application, and a set of service modules 27. Service modules 27 may further include a set of Open Data Protocol (OData) Representational State Transfer (REST) Application Programming Interface (API) endpoints, and a set of service APIs/business logic. A user may interact with orchestrator 14 via orchestrator UI 17 (e.g., by opening a dedicated orchestrator interface on a browser), to instruct orchestrator 14 to carry out various actions, which may include for instance starting jobs on robot 12, creating robot groups, assigning workflows to robots, adding/removing data in queues, scheduling jobs to run unattended, analyzing logs per robot or workflow, etc. Orchestrator UI 17 may use Hypertext Markup Language (HTML), JavaScript (JS), or any other data format known in the art.

Orchestrator 14 may carry out actions requested by the user by selectively calling service APIs/business logic. In addition, orchestrator 14 may use the REST API endpoints to communicate with robot 12. The REST API may include configuration, logging, monitoring, and queueing functionality. The configuration endpoints may be used to define and configure application users, permissions, robots, assets, releases, etc. Logging REST endpoints may be used to log different information, such as errors, explicit messages sent by the robots, and other environment-specific information, for instance. Deployment REST endpoints may be used by robots to query the version of RPA script 40 to be executed. Queueing REST endpoints may be responsible for queues and queue item management, such as adding data to a queue, obtaining a transaction from the queue, setting the status of a transaction, etc. Monitoring REST endpoints may monitor the web application component of orchestrator 14 and RPA agent 24.

In some embodiments, RPA environment 10 (FIG. 1) further comprises a database server 16 connected to an RPA database 18. In an embodiment wherein server 16 is provisioned on a cloud computing platform, server 16 may be embodied as a database service, e.g., as a client having a set of database connectors. Database server 16 is configured to selectively store and/or retrieve data related to RPA environment 10 in/from database 18. Such data may include configuration parameters of various robots 12*a-c*, robot groups, as well as data characterizing workflows executed by various robots, and data characterizing users, roles, schedules, queues, etc. Another exemplary category of data stored and/or retrieved by database server 16 includes data characterizing the current state of each executing robot. Yet another exemplary category of data includes messages logged by various robots during execution. Database server 16 and database 18 may employ any data storage protocol and format known in the art, such as structured query language (SQL), ElasticSearch™, and Redis™, among others. In some embodiments, data is gathered and managed by orchestrator 14, for instance via logging REST endpoints. Orchestrator 14 may further issue structured queries to database server 16.

In some embodiments, RPA environment 10 (FIG. 1) further comprises communication channels/links 15*a-e* interconnecting various members of environment 10. Such links may be implemented according to any method known in the art, for instance as infrastructure as a service, virtual network links, virtual private networks (VPN), or end-to-end tunnels. Some embodiments further encrypt data circulating over some or all of links 15*a-e*.

Figure 3:
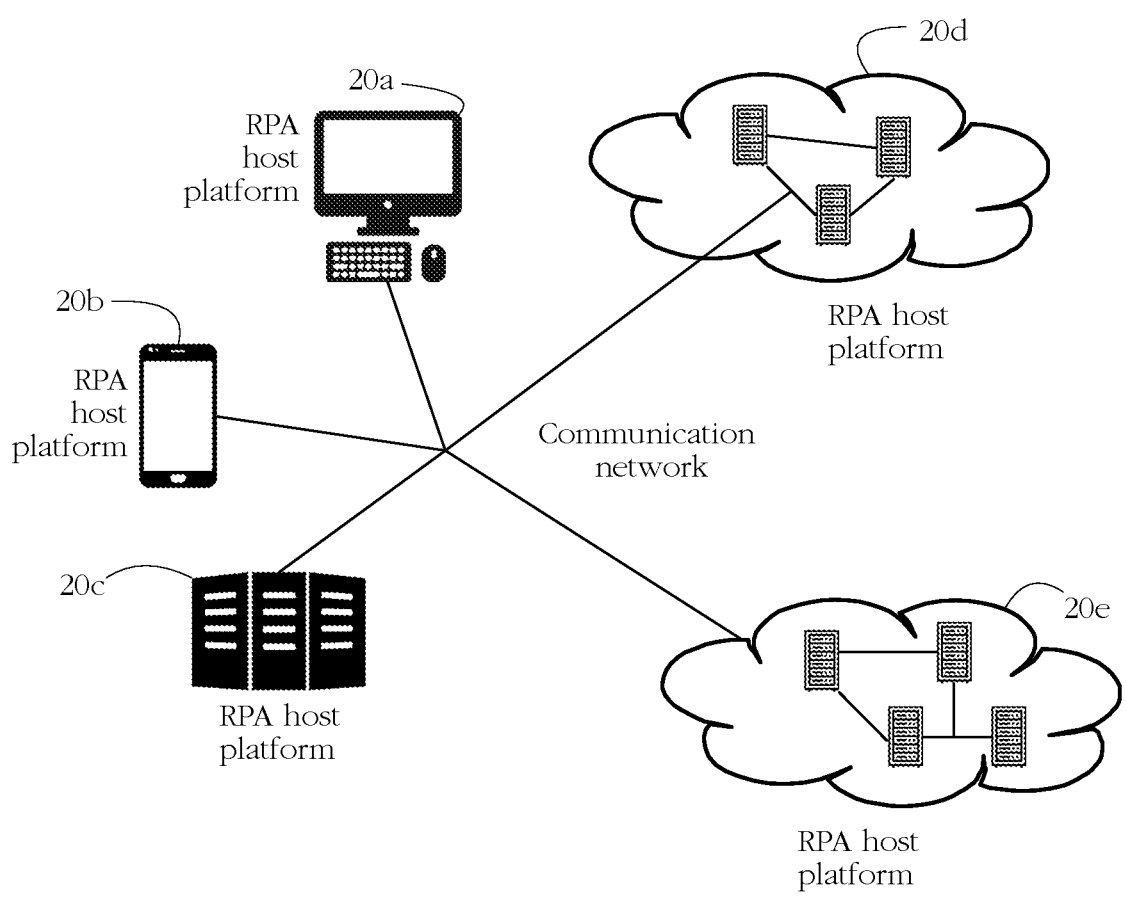
FIG. 3 shows a variety of RPA host platforms according to some embodiments of the present invention.

A skilled artisan will understand that various components of RPA environment 10 may be implemented and/or may execute on distinct host platforms (physical appliances and/or virtual machines.) FIG. 3 shows a variety of RPA host platforms 20*a-e* according to some embodiments of the present invention. Each host platform 20*a-e* represents a computing system (e.g. an individual computing appliance, or a set of interconnected computers) having at least a hardware processor, a memory unit and a network adapter enabling the respective RPA host to connect to a computer network and/or to other computing devices. Exemplary RPA host platforms 20*a-c* include personal computers, laptop and tablet computers, mobile telecommunication devices (e.g., smartphones), and corporate mainframe computers, among others. Other exemplary hosts platforms illustrated as platforms 20*d-e* include cloud computing platforms such as server farms operated by Amazon™ AWS and Microsoft™ Azure™. A cloud computing platform comprises a plurality of interconnected server computer systems centrally-managed according to a platform-specific protocol. Clients may interact with such cloud computing platforms using platform-specific interfaces/software layers/libraries (e.g., software development kits—SDKs, plugins, etc.) and/or a platform-specific syntax of commands. Exemplary platform-specific interfaces include the Azure™ SDK and AWS™ SDK, among others.

Yet another exemplary host includes an on-premises computer (e.g., server.) The term "on-premises" is used herein to denote hardware owned by the person/organization using the respective provisioned RPA software, as opposed to for instance a cloud platform, which is owned by an entity distinct from said person/organization.

FIGS. 4-A-B shows exemplary software executing on an RPA host platform 20 in various configurations. The illustrated RPA host platform 20 may represent any of RPA hosts 20*a-e* in FIG. 3. In one such embodiment illustrated in FIG. 4-A, platform 20 executes an operating system (OS) 30 and an instance of an RPA target application 32, i.e., the software application targeted for automation by robot 12, for instance Microsoft Excel™. OS 30 may comprise any widely available operating system such as Microsoft Windows™, MacOS™, Linux™, iOS™, or Android™, among others, comprising a software layer that interfaces between application 32 and the hardware of host platform 20. RPA target application 32 generically represents any computer program used by a human operator to carry out a task. Exemplary applications 32 include, among others, a word processor, a spreadsheet application, a graphics application, a browser, a social media application, and an electronic communication application.

In some embodiments that employ hardware virtualization technologies such as cloud computing among others, some components of RPA environment 10 may execute within a virtual machine (VM), as shown in FIG. 4-B. Virtual machines are known in the art as emulations of actual physical machines/computer systems, capable of running an operating system and other applications. Some cloud computing platforms employ a hypervisor to expose a set of VMs 28*a-b*. Exposing a VM encompasses creating or enabling a plurality of virtualized devices, such as a virtual processor and virtual controllers, and presenting such virtualized devices to software in place of the real, physical devices of host platform 20. Each virtualized device (e.g., processor, input, output, storage, etc.) emulates at least some of the functionality of the respective physical device of host platform 20. For instance, software executing on a virtualized processor may send and/or receive network traffic via a virtualized network adapter. The hypervisor may further enable multiplexing (sharing) of hardware resources of RPA host 20 by multiple VMs. In some embodiments, such sharing is configured so that each VM 28*a-b* operates independently and is unaware of other VMs executing concurrently on host platform 20.

FIG. 4-B shows an exemplary embodiment wherein RPA robot 12 and RPA target application 32 execute within a VM. In such embodiments, RPA environment 10 (FIG. 1) may include a set of virtual machines that execute the respective robot(s) 12*a-c*, orchestrator 14 and/or database server 16. In some embodiments, environment 10 may further comprise RPA target application(s) 32.

Figure 5:
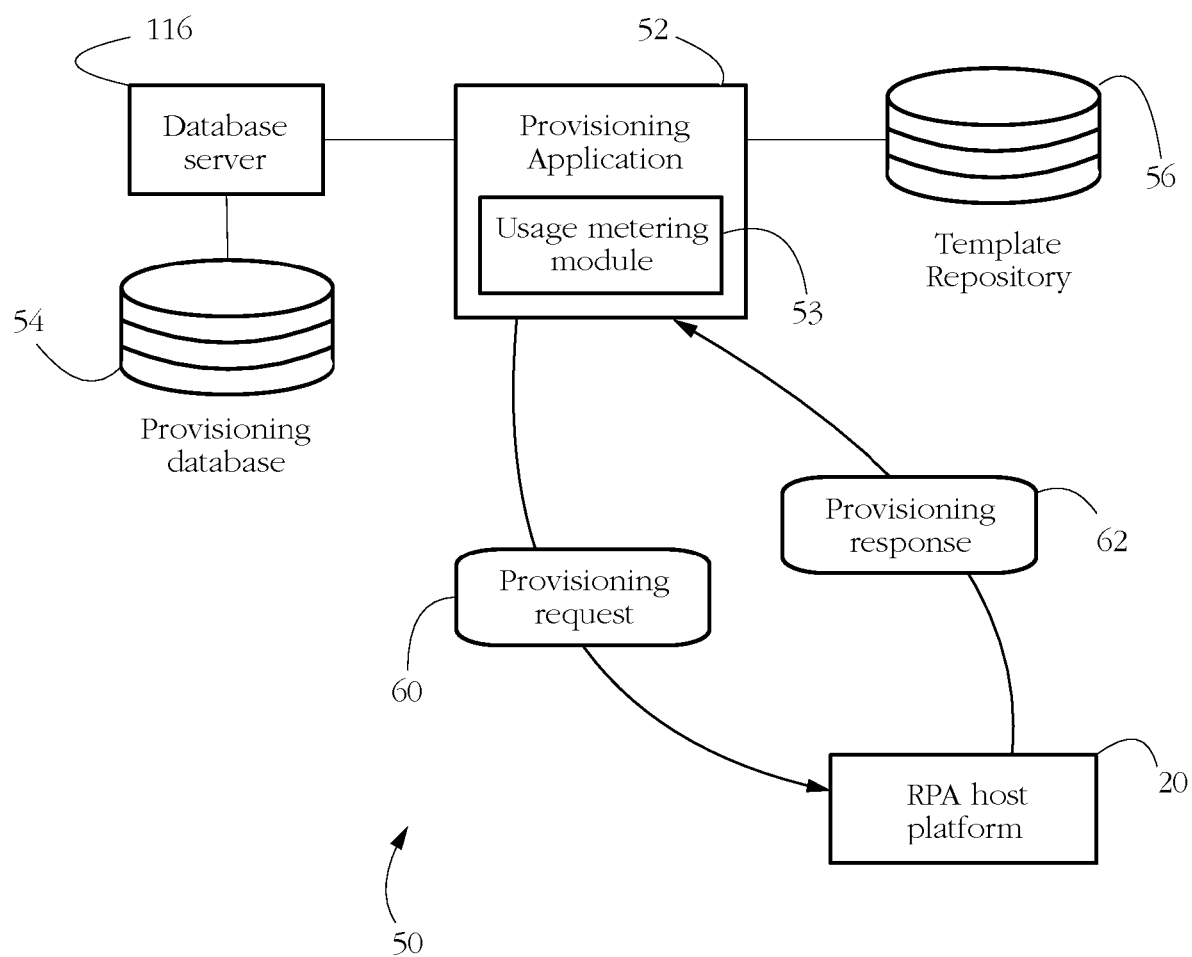
FIG. 5 shows an exemplary RPA environment provisioning system according to some embodiments of the present invention.

FIG. 5 shows an exemplary environment provisioning system 50 according to some embodiments of the present invention. System 50 is configured to automatically provision an RPA environment (e.g., environment 10 in FIG. 1) in response to a user request, as shown in detail below. The illustrated provisioning system 50 includes a provisioning application 52 and a template repository 56. Some embodiments further comprise a database server 116 communicatively coupled to a provisioning database 54. A skilled artisan will understand that not all illustrated components need to execute on the same physical computer.

In a preferred embodiment, provisioning application 52 executes as a web application exposing a web interface to a user, which may access it via a browser. Alternatively, application 52 may execute on the user's machine. In response to receiving input from the user, application 52 may initiate a series of provisioning procedures via a set of provisioning requests 60 sent to a selected RPA host platform 20. Requests 60 may include a set of commands and/or a script formulated in a programming/scripting language. An exemplary provisioning request may include an authentication exchange followed by a command to instantiate a VM on RPA host platform 20. Another exemplary request 60 may include an image of the virtual machine to be instantiated. Yet another exemplary provisioning request 60 includes a set of commands for establishing a virtual network connection (e.g., a VPN link) between two provisioned entities such as a provisioned orchestrator and a provisioned database server/service.

In response to receiving request 62, RPA host platform 20 may transmit a provisioning response 62 back to application 52, response 62 including, for instance, an acknowledgement of receiving a request, a status of a received request indicating whether the request was executed successfully or whether carrying out the operations specified in the respective request have failed, a set of error codes indicating a reason for a failure to carry out a procedure specified in a received request, etc. Provisioning response 62 may further include a set of credentials for accessing a provisioned resource (e.g., VM, robot, orchestrator) and/or an address (e.g., network address, uniform resource locator—URL, fully qualified domain name—FQDN) of the respective provisioned resource.

In some embodiments, for instance wherein host 20 is a cloud computing platform, provisioning application 52 may not communicate to the actual machine that will ultimately host components of the provisioned environment, but to a cloud management server/interface that may subsequently select and configure the respective physical machine to receive and/or execute the provisioned resource.

In some embodiments, RPA environments available for provisioning are described and managed by means of pre-designed environment templates. Each template may comprise a data structure characterizing a set of RPA components such as a fleet of robots, an orchestrator, and a database server/service. In some embodiments, templates include memory images (e.g., snapshots) of the respective software components (virtual machines, robots, target applications, etc.). An image of a software entity herein denotes a data structure which, when loaded into a memory of a computer system, causes the computer system to execute the respective software entity.

Each template may further include an indicator (e.g. URL or network address) of a target RPA host platform where the respective environment is to be provisioned. In some embodiments, templates may specify a target host platform for each component of the provisioned environment, i.e., distinct environment components may be provisioned to distinct host platforms as indicated in the template. In one such example, a template indicates that one component of an RPA environment is to be provisioned on a cloud platform, while another component must be provisioned to an on-premises corporate server. Templates may further include a set of commands and/or scripts for instantiating each respective component on its target RPA host platform, as well as a set of credentials for accessing and/or for executing code on the respective RPA host platform. In some embodiments, templates are host-specific, i.e., each template is formulated and configured to be used for provisioning the respective environment on a particular set of host platforms. For instance, there may be distinct templates for provisioning a web-scraping robot on a local machine versus on a cloud computing platform such as Microsoft™ Azure™. Templates may be developed, tested, and maintained by a team of engineers according to specifications and/or wishes of various users. Templates may be stored in and selectively retrieved from a template repository 56, which may comprise a database using any protocol and data format known in the art (e.g. relational database, Redis™ store, etc.)

In some embodiments, provisioning database 54 stores various parameters and/or other data characterizing a provisioned RPA environment. Such data/parameters may include a current state of each component of a provisioned environment (e.g., virtual machines, robots, orchestrator, network connections between components, database servers/services, etc.), as well as a set of locations and/or credentials for accessing the respective components. Database 54 and associated server 116 may be implemented using any data storage protocol and format (for instance as a Redis™ store).

Provisioning database 54 may further store a user management data structure characterizing a set of users of provisioning application 52. Each user may be characterized by, among others, a set of access credentials (e.g., username, password, account name, etc.), an application role (e.g., administrator, regular user, guest, etc.), and a user group that the respective user belongs to. In an exemplary multitenant embodiment, distinct user groups may represent distinct corporate clients or distinct subgroups of the same client. For each group and/or member of a group, database 54 may further store an indicator of an association between the respective group/user and a subset of templates of template repository 56. Such associations may enable application 52 to expose distinct templates to distinct users and/or user groups, as described in more detail below.

In some embodiments, provisioning database 54 further stores a usage metering data structure characterizing template usage policies and/or a resource usage in relation to RPA environment provisioning. In one example, database 54 may associate each user/group with a usage counter indicative of an amount of a computing resource consumed during a pre-determined time interval (e.g., current month, current quarter, etc.) by the respective user/group. An exemplary amount of computing resources includes a total amount of time a particular component of RPA environment 10 executes on the respective cloud computing platform, an amount of memory and/or storage space occupied by a provisioned RPA component, a count of provisioned RPA environments (e.g., how many times the respective environment was provisioned during the current metering interval), a count of provisioned RPA components (e.g., how many instances of RPA robot 12 were created), an amount of data exchanged between two RPA components via a provisioned network connection, etc.

In some embodiments, database 54 may also associate each user/group with a maximum amount of each computing resource allocated for spending by the respective user/group. Stated otherwise, some embodiments enable setting a resource-specific RPA provisioning budget per user and/or group of users, and monitoring the way the respective budget is being spent. Resource usage budgets may be template-specific, i.e., there may be distinct budgets allocated to each type of provisioned RPA environment. For instance, there may be a maximum number of times the respective environment may be provisioned during each metering interval. In another example, each template/RPA environment may be allocated a maximum provisioning time, i.e., the respective environment may be provisioned any number of times, but the total provisioning time may not exceed a pre-determined limit.

In some embodiments, provisioning application 52 includes a usage metering module 53 configured to enforce template usage policies, to implement user-indicated resource budgets and/or to determine a current usage level of each metered resource. For instance, usage metering module 53 may populate provisioning database 54 with values indicating a maximum provisioning time for each template, user, and/or group. Module 53 may further maintain a set of usage meters associated with each template, user and/or group, each usage meter indicating an amount of a respective resource consumed during a current metering interval on provisioning the respective RPA environment by the respective user and/or group, etc.

The functionality of provisioning application 52 may differ according to a user role of each user. For instance, application 52 may selectively expose a configuration interface enabling users with administrator privileges to create and edit user profiles and to assign users to groups. Meanwhile, regular users may not be given access to the respective configuration interface. Some embodiments may assign group-specific administrator roles, wherein a group administrator may be allowed to configure certain access and/or usage parameters for members of the respective group, but not for members of other groups. In some embodiments, provisioning application 52 may selectively expose a resource budgeting interface enabling an administrator of a user group to allocate resource-specific and/or template-specific budgets to group members and/or individual users.

In one such example, an administrator may set a time budget for each of a set of RPA templates and/or each user/group. Such budgeting may indicate, for example, a 10 hour limit for provisioning a specific SAP™ demo. In another example the administrator may set a time budget for each of a set of host platforms 20a-e; such budgeting may indicate for instance, a 10 hour limit for provisioning of AWS™ cloud services and a 6 hour limit for provisioning of Azure™ cloud services.

Figure 6:
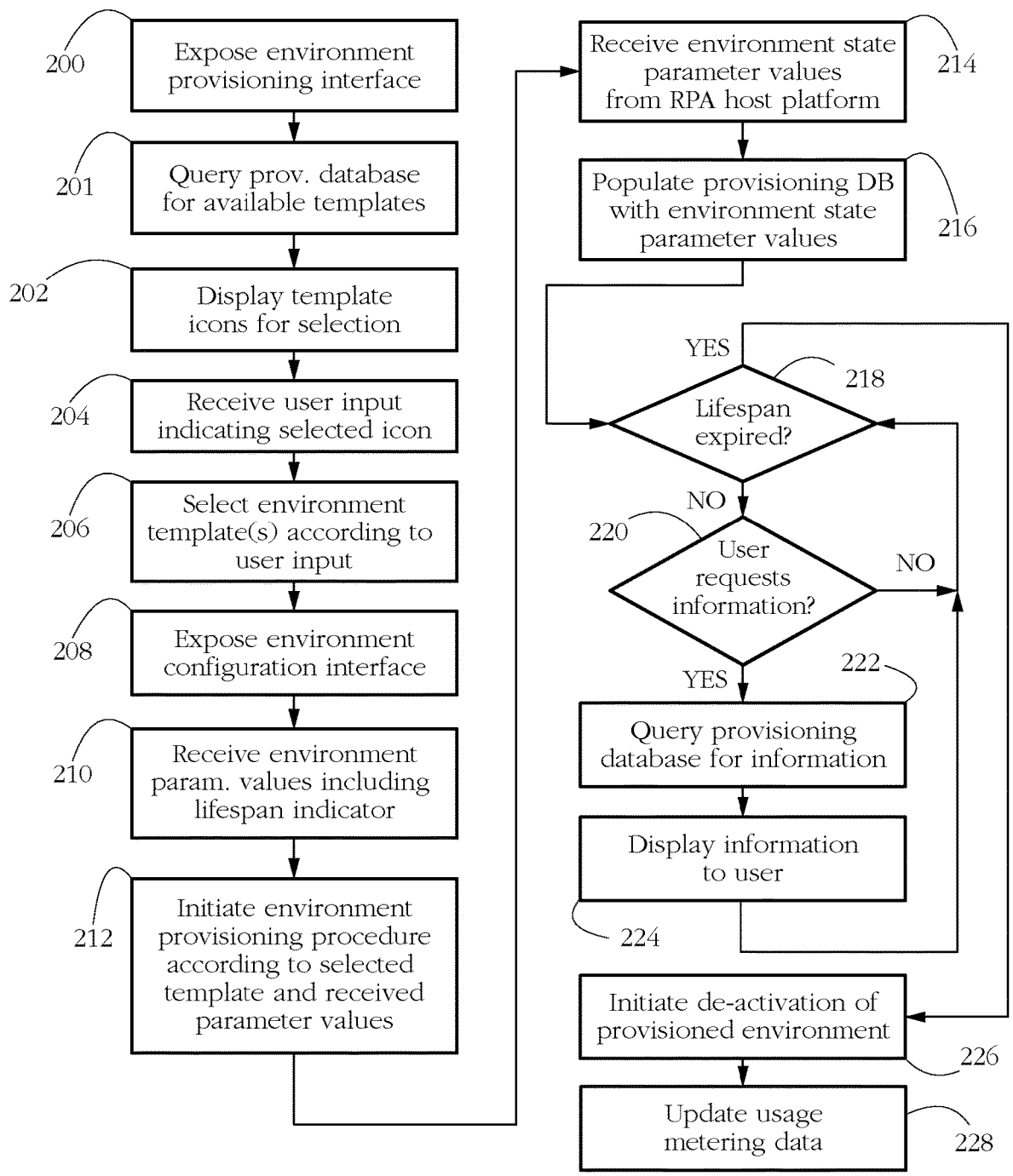
FIG. 6 shows an exemplary sequence of steps performed by an environment provisioning system according to some embodiments of the present invention.
Figure 7:
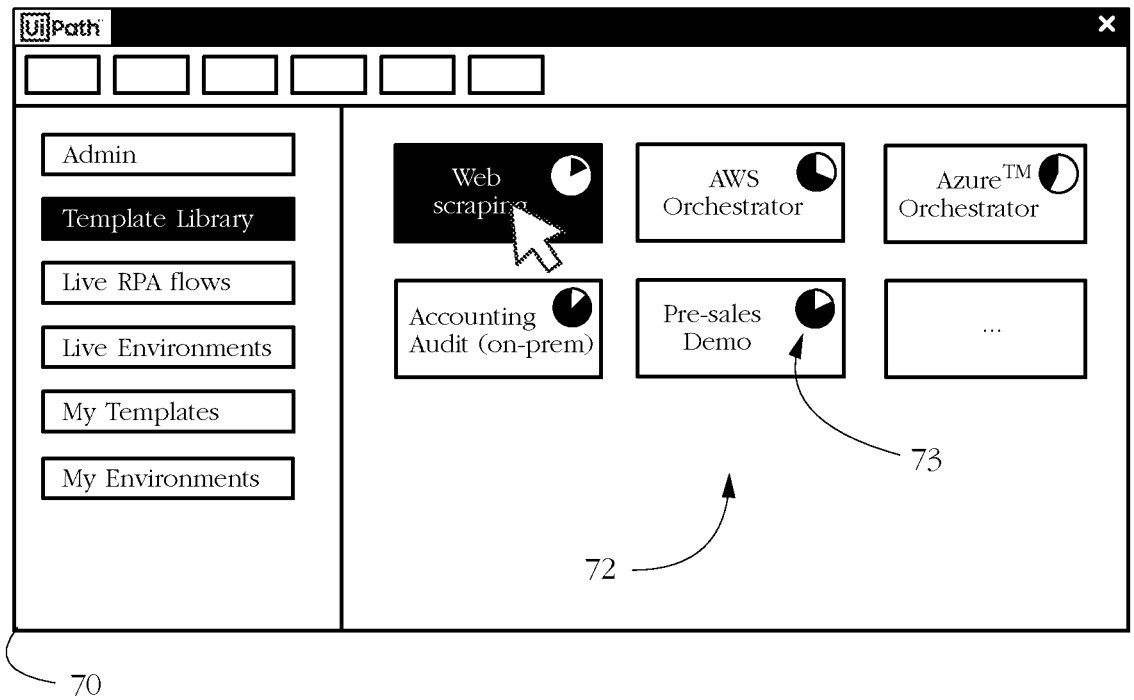
FIG. 7 illustrates an exemplary graphical user interface (GUI) exposed by the environment provisioning system according to some embodiments of the present invention.

FIG. 6 shows an exemplary sequence of steps carried out by environment provisioning system 50 (e.g., application 52) according to some embodiments of the present invention. In a step 200, provisioning application 52 may expose a provisioning interface to a user. Step 200 may include displaying a login screen, receiving a set of user credentials for accessing application 52, and identifying the current user and his/her user role/privileges according to the provided credentials. An exemplary provisioning user interface 70 is shown in FIG. 7. The illustrated interface may comprise an application GUI or a web interface accessed via a browser executing on the user's computer. Provisioning GUI 70 may include a menu enabling the user to select from a set of tasks such as visualizing a status of provisioned environments, accessing a provisioned environment, etc. The menu may comprise an item herein illustrated as "Template library" which, when invoked, may display a set of GUI elements (e.g., icons 72) indicative of various RPA environments available for provisioning, for instance as shown. Each icon 72 may represent a distinct RPA template stored in repository 56. The manner in which the various environment templates are indicated or presented for selection is not meant to be limiting; a skilled artisan will understand that other presentations are also possible, such as lists, trees, etc. Some templates may be grouped together according to various criteria (for instance according to the target RPA host platform, e.g., all Azure™ templates in one group) and displayed hierarchically, etc. Some embodiments may display templates designed for provisioning on distinct cloud computing platforms together, in the same view.

Templates may be selectively associated with users and/or user groups, so the set of icons that a user sees may vary according to an identity (e.g. username, group membership, role within the organization, etc.) of the respective user. To populate GUI 70, in a step 201, provisioning application 52 may query provisioning database 54 and determine an eligible set of templates according to a set of criteria such as the identity of the current user, security and/or confidentiality considerations (e.g., whether the respective user is allowed to access certain resources or locations, etc.), current geographical location and/or current time. Some embodiments may further determine whether a particular template/icon is eligible for display according to a current resource usage level and/or provisioning budget associated with the respective template and/or the respective user/group. In one such example, templates for which the provisioning budget has been reached or exceeded may not be displayed to the user. In another example, the appearance of some icons 72 may be changed (e.g., the respective icons may be faded or smaller than the others, etc.) to indicate to the user that the current budget settings for the respective template do not allow provisioning the respective environment. In some embodiments, step 201 may comprise performing additional computations to determine whether a particular template is eligible for provisioning. In one such example, a particular RPA template indicates that one component of RPA environment 10 must be provisioned on a first host platform, while another component must be provisioned on a second host platform. In a situation wherein a provisioning budget associated with the first RPA host platform has been exceeded, the respective template/environment may no longer be eligible for provisioning even if the budget associated with the second RPA host platform allows it.

A step 202 may display icons 72 representing the eligible set of environment templates. For each eligible template, some embodiments may further display a usage metering indicator 73 indicative of a current usage level of a provisioning resource associated with the respective template (e.g., the total amount of time the respective template has been provisioned during the current metering interval.) In the illustrated example of FIG. 7, each usage metering indicator 73 comprises a pie chart showing the current usage level as a proportion of the provisioning budget allocated to the respective template.

Figure 8:
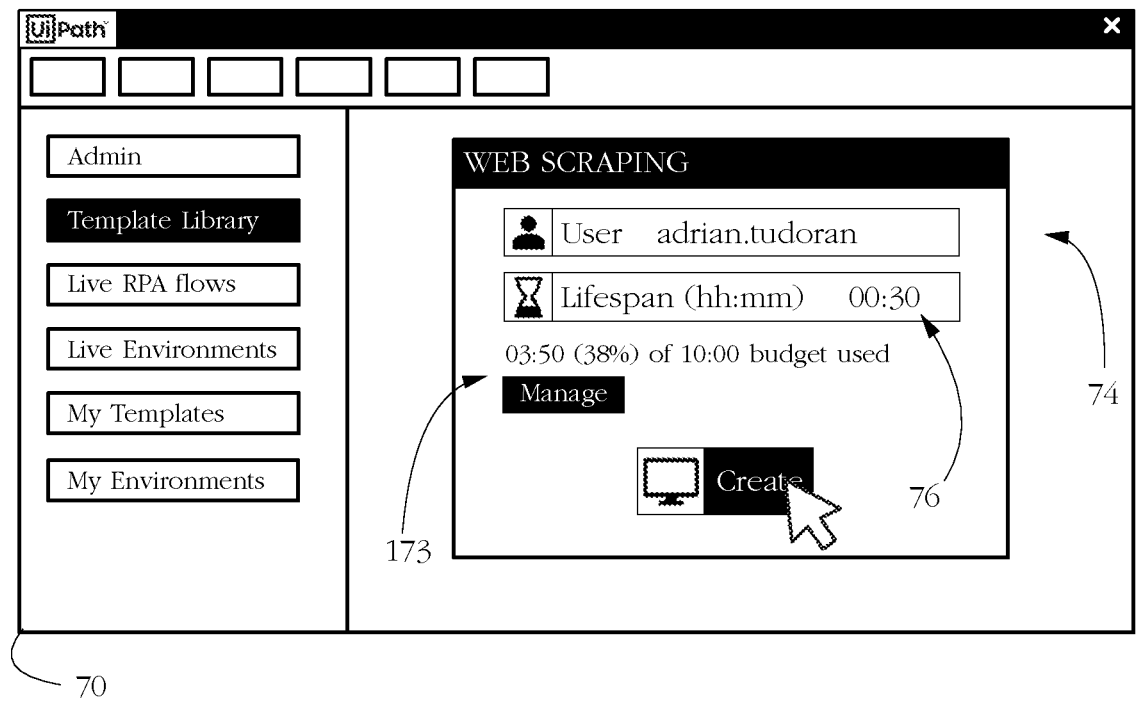
FIG. 8 illustrates another exemplary view of the GUI exposed by the environment provisioning system according to some embodiments of the present invention.

In a step 204, application 52 may receive a user input indicating a template selection, for instance by determining that the user has clicked on a particular icon. In a further step 206, some embodiments may then access template repository 56 and select a provisioning template corresponding to the RPA environment indicated by the user's chosen item. Application 52 may further selectively retrieve a set of data characterizing the respective RPA environment (e.g., name, description, customizable parameters, etc.) A further step 208 may expose an environment configuration interface enabling the user to set desired parameter values for the respective environment and/or provisioning instance. An exemplary environment configuration interface according to some embodiments of the present invention is illustrated in FIG. 8. Exemplary customizable parameters may include a set of credentials 74 and an environment lifespan 76, among others. Credentials 74 may include usernames and/or passwords for accessing the target RPA host platform (a cloud computing platform such as Microsoft Azure™, an on-premises corporate server, etc.) and/or usernames and/or passwords for accessing various components of the future provisioned environment. In another exemplary template for provisioning a fleet of robots, one exemplary customizable parameter may indicate a number of robots to be instantiated.

In some embodiments, environment lifespan 76 includes an indicator of a desired amount of time and/or a schedule when the provisioned environment should be active and/or available to the respective user. In one example, lifespan 76 may be specified as a duration (e.g., 30 minutes, 2 days) with respect to the current, present time or with respect to a moment when the provisioned environment becomes active and/or available to the user. In another exemplary embodiment, lifespan 76 may comprise an explicit time interval between a start time and an end time (e.g. January 13$^{th}$, next Tuesday from 9:00 AM to 10 AM PST, next Christmas). Other exemplary embodiments may allow specifying lifespan 76 according to a rule (e.g., Tuesdays from 3:00 PM to 5:00 PM, the last Friday of each month etc.) Some embodiments allow the user to specify any value for lifespan 76. In some embodiments, lifespan 76 is environment-specific and/or session-specific, in the sense that the user may set different lifespans for different provisioned environments and/or the lifespan may differ between one instance of a selected environment and another. Lifespan 76 is specifically the lifespan of the associated environment being provisioned and is distinct from a length of any subscription to the respective cloud computing platform or any duration of a license to use a particular piece of software such as robot(s) 12 or orchestrator 14.

To inform the user and assist in choosing provisioning lifespan 76, some embodiments of environment configuration interface display a usage metering indicator 173 indicative of a current usage level associated with the respective template. In the example illustrated in FIG. 8, the environment configuration interface further exposes a control (e.g., button) enabling the user to manage budget settings for the respective template. In some embodiments, the respective button is only exposed to selective users, e.g., administrators.

A step 210 may receive such user input including lifespan indicator 76. When the user does not explicitly provide a provisioning lifespan, some embodiments may automatically assign a default value (e.g., 30 minutes) to the respective parameter. The user may indicate an intention to proceed with provisioning by clicking a button or pressing a pre-defined combination of keys. In response to receiving such input, in a step 212, application 52 may initiate an environment provisioning procedure according to the selected template and user-supplied parameter values. Provisioning may include selectively retrieving the appropriate template, identifying target RPA host platform 20 (e.g., cloud computing platform, on-premises corporate server, etc.) according to the template, determining a location (e.g., URL) of host platform 20, and determining a set of credentials for accessing the respective host, among others. Initiating the provisioning procedure may denote, for instance, transmitting a set of provisioning requests 60 configured according to the respective template, requests 60 comprising provisioning commands/scripts/configuration parameters pre-designed to cause RPA host platform 20 to instantiate components of the respective RPA environment and/or to configure platform-specific services such as setting up communication links, database servers/clients/sockets, etc.

An exemplary provisioning of an RPA environment to a cloud computing platform comprises instantiating a virtual machine on the respective platform, the VM pre-loaded with a robot and a target application, and further configuring a set of platform-specific services such as a database service and a virtual network (e.g., network-as-a-service) connecting the respective VM to an orchestrator service. Such services are herein described as platform-specific because their implementation (e.g., architecture and management) differs among cloud computing platforms. Furthermore, configuration commands and/or protocols for administering and/or interacting with such services are platform-dependent.

In some embodiments, some components of the provisioned RPA environment are delivered to distinct RPA host platforms 20. For instance, a virtual machine comprising RPA robot 12 (see e.g., FIG. 4-B) may be provisioned on an AWS™ cloud, while database server 16 may be provisioned as an Azure™ SQL service. Some or all of virtual network links 15a-e (FIG. 1) connecting environment components may be provisioned as services from yet another cloud computing provider. In another exemplary embodiment, orchestrator 14 executes on-premises on a corporate server of the client, while robots 12 are provisioned to a commercial cloud computing platform (e.g., Azure™). Provisioning complex RPA environments like these may comprise, for each environment component, identifying an RPA host platform for the respective component, retrieving a platform-specific script/set of commands from the respective environment template, and transmitting provisioning request 60 to the respective RPA host platform, request 60 configured to instantiate the respective component on the respective RPA host platform.

In some embodiments, in a step 214, provisioning application 52 receives provisioning response(s) 62 issued by RPA host platform 20 and/or other computer systems/services, responses 62 indicating whether provisioning of various components and/or services was successful and/or indicating a current state of each component. One exemplary response 62 may include a set of credentials for accessing the provisioned environment or a component thereof. Another response 62 may include an indicator of a location (e.g., network location, URL, FQDN, etc.) of a particular component or web interface for accessing or managing the respective component. In a step 216, some embodiments may populate provisioning database 54 with the received parameter values.

Figure 9:
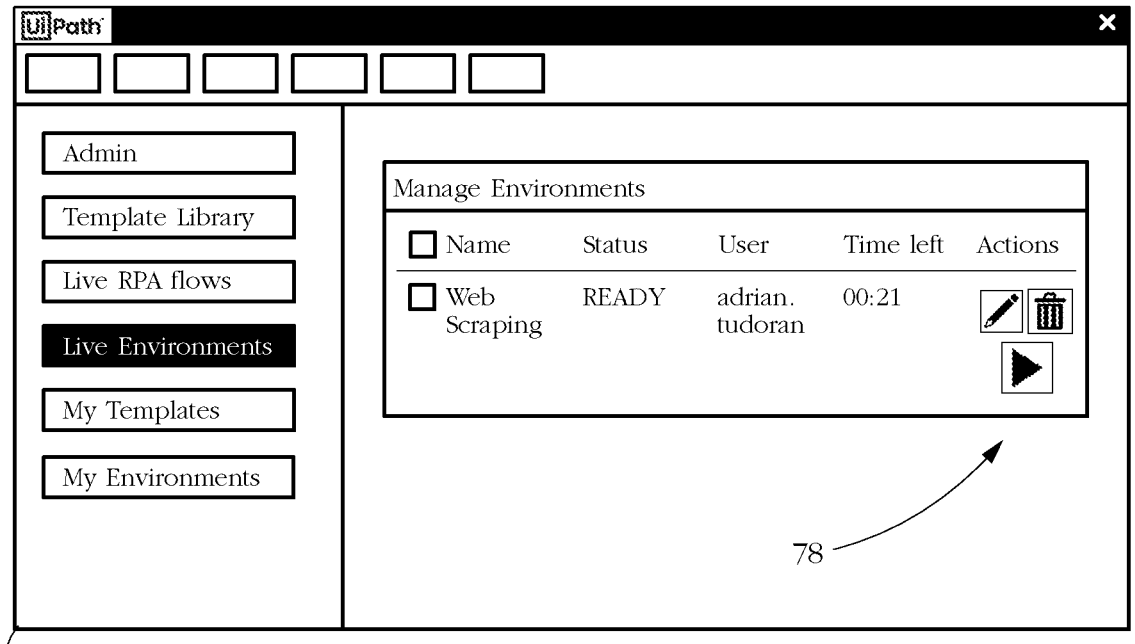
FIG. 9 shows yet another exemplary view of the GUI exposed by the environment provisioning system according to some embodiments of the present invention.

A step 218 determines whether the provisioning lifespan of the respective provisioned environment has expired. While the provisioning lifespan has not expired, some embodiments wait for and respond to the user's input to provisioning application 52. In some embodiments, provisioning GUI 70 is configured to display a set of details about each provisioned environment to the user. FIG. 9 shows such a GUI view according to some embodiments of the present invention. The illustrated view shows, among others, a current status and a time left till the expiration of the provisioning lifespan of each provisioned environment. GUI 70 may further expose a set of controls 78 (e.g., GUI icons) enabling a user to edit various operational parameters of the respective environment and/or template, to explicitly de-activate/delete the respective environment (thus overriding the current lifespan settings), and/or to access various components of the respective environment.

Figure 10:
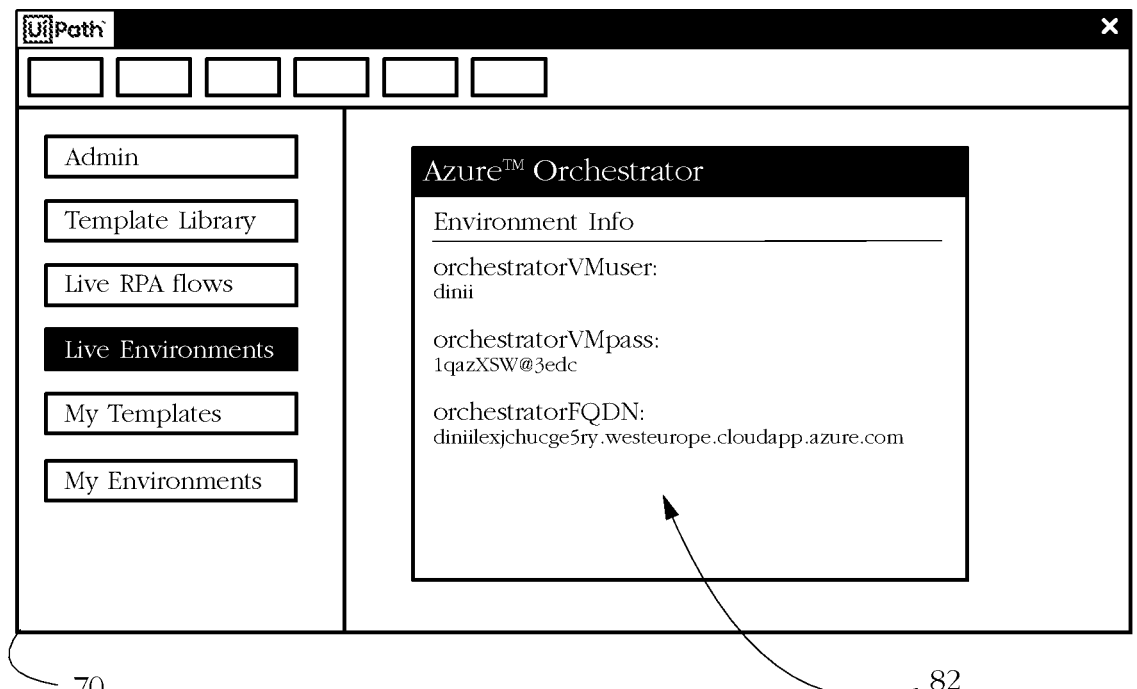
FIG. 10 shows another exemplary view exposed by the environment provisioning system according to some embodiments of the present invention.

In response to receiving user input indicating a user's request to display, update and/or edit available information regarding a selected environment, in a sequence of steps 222-224 some embodiments of provisioning application 52 may query provisioning database 54 for the respective data and display it to the user. In one such example illustrated in FIG. 10, GUI 70 may display a set of items 82 including a FQDN and credentials for accessing a web interface of the provisioned instance of orchestrator 14. In some embodiments, any location indicator may be hyperlinked so that a click on the respective data item may automatically take the user to the respective resource (in the above example, the web interface of orchestrator 14).

When the provisioning lifespan has expired, in a step 226, application 52 may initiate a de-activation of the provisioned environment. In some embodiments, de-activating an environment comprises terminating the provisioned instance of a component of the respective environment, for instance an RPA robot, orchestrator 14 and/or a virtual machine configured to execute the respective component. De-activating the environment may also include terminating or de-activating a platform-specific service such as a virtual network and/or a database service. In an alternative embodiment, de-activating the provisioned environment may comprise making some components of the respective environment unavailable to the respective user (e.g., by logging the respective user out of orchestrator UI 17, etc.) In some embodiments wherein various components of the provisioned RPA environment are instantiated on distinct RPA host platforms, step 226 may comprise transmitting multiple provisioning requests 60 to multiple host platforms, each request 60 configured to cause the respective RPA host to terminate/de-activate the respective provisioned component.

A skilled artisan will understand that handling provisioning lifespan 76 and timing the provisioning and/or de-activation of the provisioned RPA environment may be executed in various ways. In a preferred embodiment, in steps 212 and/or 216 provisioning application 52 may create a set of timed activation and/or de-activation jobs and add the respective jobs to a job queue maintained by provisioning application 52 or another entity such as provisioning database server 116. One such example is adding a timed job to a Redis™ job queue. An exemplary activation job may comprise transmission of a provisioning request 60 comprising a set of commands/a script causing a provisioning of a selected RPA environment to a selected host platform. The activation job may be configured to execute only at the beginning of a provisioning lifespan of the respective environment (this example applies for instance to lifespans 76 specified according to a schedule or rule, e.g., at 10:00 AM on the last Friday of each month). In turn, a de-activation job may comprise transmission of a provisioning request 60 comprising a set of commands/a script causing a selected RPA host platform to terminate/de-activate a selected environment component. The timed de-activation job may be configured to execute only when the provisioning lifespan of the respective environment has expired.

In response to de-activating the provisioned environment, in a step 228 usage metering module 53 may update usage metering data to indicate a current usage level of each metered resource.

Figure 11:
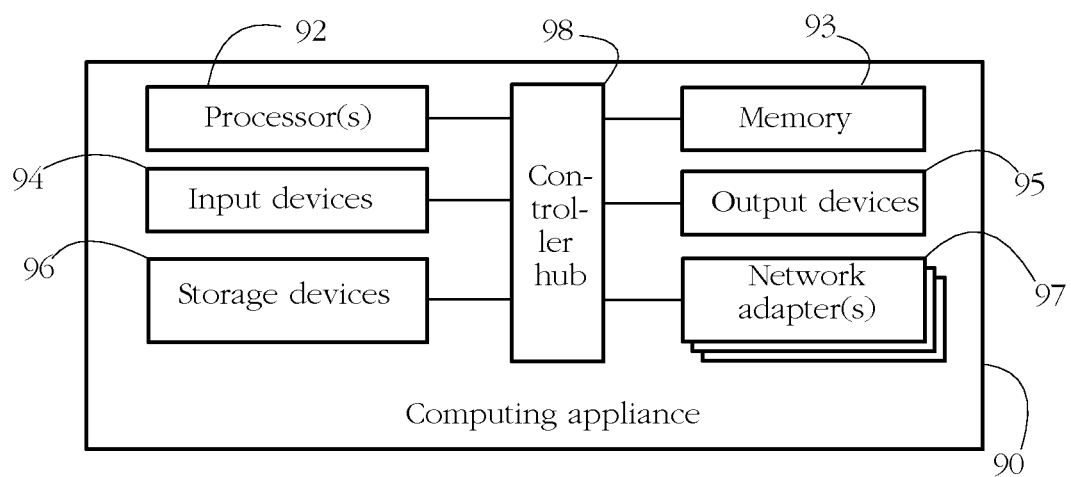
FIG. 11 shows an exemplary hardware configuration of a computing appliance configured to carry out a method according to some embodiments of the present invention.

FIG. 11 shows an exemplary hardware configuration of a computing appliance 90 programmed to execute some of the methods described herein. Appliance 90 may represent any of RPA host platforms 20a-e in FIG. 3, as well as a computer executing provisioning application 52, for instance. The illustrated appliance is a personal computer; other computing devices such as servers, mobile telephones, tablet computers, and wearables may have slightly different configurations. Processor(s) 92 comprise a physical device (e.g. microprocessor, multi-core integrated circuit formed on a semiconductor substrate) configured to execute computational and/or logical operations with a set of signals and/or data. Such signals or data may be encoded and delivered to processor(s) 92 in the form of processor instructions, e.g., machine code. Processor(s) 92 may include a central processing unit (CPU) and/or an array of graphics processing units (GPU).

Memory unit 93 may comprise volatile computer-readable media (e.g. dynamic random-access memory—DRAM) storing data/signals/instruction encodings accessed or generated by processor(s) 22 in the course of carrying out operations. Input devices 94 may include computer keyboards, mice, and microphones, among others, including the respective hardware interfaces and/or adapters allowing a user to introduce data and/or instructions into appliance 90. Output devices 95 may include display devices such as monitors and speakers among others, as well as hardware interfaces/adapters such as graphic cards, enabling the respective computing device to communicate data to a user. In some embodiments, input and output devices 94-95 share a common piece of hardware (e.g., a touch screen). Storage devices 96 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 97 enable the respective computing device to connect to an electronic communication network (e.g, FIG. 3) and/or to other devices/computer systems.

Controller hub 98 generically represents the plurality of system, peripheral, and/or chipset buses, and/or all other circuitry enabling the communication between processor(s) 92 and the rest of the hardware components of appliance 90. For instance, controller hub 98 may comprise a memory controller, an input/output (I/O) controller, and an interrupt controller. Depending on hardware manufacturer, some such controllers may be incorporated into a single integrated circuit, and/or may be integrated with processor(s) 92. In another example, controller hub 98 may comprise a northbridge connecting processor 92 to memory 93, and/or a southbridge connecting processor 92 to devices 94, 95, 96, and 97.

The exemplary systems and methods described above enable even non-technical users to provision complex RPA environment and applications on-demand. In one use-case scenario, a sales representative needs to demonstrate various RPA robots to potential clients. However, when the demonstrated RPA system is rather complex, for instance when it involves multiple robots coordinated by an orchestrator, the sales representative may need more than a personal computer/laptop to demonstrate the functionality of the respective RPA. Furthermore, sometimes the respective RPA robots execute remotely, on computers and/or networks that the sales representative may not be authorized to access. In such situations, the sales representative may need to instantiate a whole RPA environment on demand for the purpose of the demonstration. Such provisioning/instantiation would be expected to require computer science knowledge and skills that substantially exceed those of an average user. Therefore, in a conventional setting, for every demonstration of the respective environment, the sales representative would need assistance from a technical team to set up the required RPA environment, for example by instantiating virtual machines and associated networking and database services. Furthermore, the respective demonstration would not be easily ported to another cloud computing platform that may use a different architecture and/or syntax.

In another use-case scenario, a user may need to carry out various RPA tasks at specific dates and/or times, for instance to perform a set of audits at different companies on the last Friday of each month. Some components required for the respective RPA tasks may need to execute in the cloud, while others may execute on each company's private computers/network. Furthermore, not all client companies may use the same cloud computing platform. Therefore, the user may need to repeatedly provision separate RPA environments for each client in order to carry out the required tasks.

In yet another use-case scenario, a developer needs to test robotic software and/or a target application, before delivering it to clients. Ideally, the tests need to be carried out in multiple configurations, on various cloud computing platforms and/or in hybrid configurations wherein some components execute in the cloud while others execute on-premises. In a conventional RPA setting, such a developer may need to manually provision each test environment, possibly multiple times during development and testing of the respective RPA system.

In contrast to such conventional RPA, some embodiments of the present invention include a user-friendly computer interface enabling provisioning of various RPA environments on demand, without the need for advanced knowledge of coding and/or of managing cloud computing platforms. Some embodiments may bring together multiple available RPA environment templates within the same user interface, allowing a user to selectively provision complex RPA environments potentially with a single click of a mouse. For instance, some embodiments may enable a user to choose whether to instantiate a desired RPA environment on-premises or to a remote cloud computing platform, by a simple choice of template. Templates may be pre-designed, maintained, and tested by a technical team and may include memory images of the required RPA components (e.g., virtual machines, robots, RPA target applications, etc.) as well as a set of provisioning commands/scripts/code snippets which, when transmitted to the intended RPA host (e.g., cloud computing platform), cause the respective host to perform the actual provisioning tasks. Templates may be platform-specific, in the sense that template provisioning code may be written in a platform-specific language and/or may call platform-specific functions or libraries. Templates may be platform-specific further because in some embodiments the type of cloud services may vary from one cloud computing platform to another, and/or the configuration settings of such services may be platform-specific.

Some embodiments further give the user the option of endowing each provisioned RPA environment with a desired lifespan, i.e., once instantiated, the respective environment will only be active/accessible for the duration of the respective lifespan, or according to a schedule. Such embodiments rely on the observation that modern cloud computing platforms may have a pay-per-use model wherein the users pay according to how long they use the provisioned features. In such commercial arrangements, it may be desirable to use cloud services efficiently, for instance to terminate virtual machines, networks, and database services when they are no longer needed. Some embodiments may therefore be simpler and more cost effective than conventional systems, by automatically provisioning environments with limited lifespan.

One exemplary template comprises data for provisioning an attended web-scraping robot on an AWS™ cloud. The robot is configured to open a set of webpages, collect structured data from them, and paste the collected data into an Excel™ spreadsheet. In some embodiments, the respective template may include a memory image of a virtual machine, preloaded with an instance of a Windows™ OS, an instance of the respective RPA robot, an instance of a browser application, and an instance of MS Excel™ (the RPA target applications in this case.) The template may further comprise a set of credentials for accessing a user interface of the AWS™ cloud service, and a set of commands/scripts configured to cause the respective cloud computing platform to instantiate a virtual machine. Provisioning the respective environment/template may comprise provisioning system 50 (FIG. 5) establishing a connection to the user interface, using the template-provided credentials to log in, transmitting the VM image and set of commands or configuration parameters that effectively cause the cloud platform to instantiate the VM on a processor of the platform. In turn, the platform may return to provisioning system 50 an URL and a username for logging into the provisioned VM. The user may then access the provisioned VM and start the robot. Provisioning system 50 may terminate the respective VM upon detecting the expiration of the indicated lifespan, by sending an appropriately formatted command or configuration parameter to the cloud platform.

A more complex example comprises provisioning a fleet of RPA robots and an orchestrator to an Azure™ cloud. The robots will execute unattended, remotely managed by the orchestrator. To provision this environment, an exemplary embodiment may first set up orchestrator 14 as an Azure™ web app service. For this, provisioning system 50 may access an Azure™ cloud computing platform with a set of subscription credentials, and execute a MSDeploy extension that installs an instance of UiPath Orchestrator™ and configures the corresponding webConfig file to interface with Redis™ and SQL databases. Provisioning system 50 may then set up the required databases (see e.g., items 16-18 in FIG. 1), configured as a managed Microsoft SQL server and associated SQL database. Provisioning system 50 may further set up Redis™ databases by instantiating three Linux™ virtual machines and executing an extension script (e.g., Bash) to install the respective Redis™ services on the newly-provisioned VMs. To install the actual RPA robot, provisioning system 50 may transmit commands to the Azure™ cloud platform to instantiate a VM running a specified version of the Windows™ OS, then execute another extension script (e.g., PowerShell) configured to install an instance of UiPath Robot™ and to connect it to the newly deployed orchestrator. In response to a successful provisioning, the Azure™ cloud computing platform may return a URL and credentials for accessing the orchestrator UI. The user may then use this information to log into the orchestrator and remotely control the provisioned robots. In some embodiments, the environment template for such an example may include the scripts/commands described above for instantiating various components and cloud services and configuring connections between them. Such scripts/commands/parameters are platform-specific in the sense that they enable the respective provisioning only on an Azure™ cloud computing to platform.

An even more complex example comprises provisioning an RPA environment to multiple RPA hosts/cloud computing platforms. For various technical, practical, and/or computer security reasons, a user may prefer to provision some components of the environment (e.g., a virtual machine executing RPA robot 12 and RPA target application 32, see e.g., FIG. 4-B) to one cloud computing platform, and another component (e.g., a database or a network service) to another cloud computing platform or to a corporate server of a client (on-premises.) Some embodiments may enable the user to automatically carry out such complex provisioning with minimal effort, by selecting a pre-configured template from the template library. The respective template may include identities and credentials for accessing each RPA host, as well as provisioning/configuration scripts for instantiating and inter-connecting all environment components.

It will be clear to one skilled in the art that the above embodiments may be altered in many ways without departing from the scope of the invention. Accordingly, the scope of the invention should be determined by the following claims and their legal equivalents.

What is claimed is:

1. A method comprising employing at least one hardware processor of a computer system to:

display to a user within a user interface a usage metering indicator indicative of an available budget for a provisioning lifespan for each of a plurality of pre-defined robotic process automation (RPA) environment templates, wherein a display size of at least part of the usage metering indicator is indicative of the available budget, each available budget determined according to a corresponding RPA environment template, wherein the user interface presents to the user for selection indicators of a plurality of pre-defined platform-specific RPA environment templates;

in response to displaying the usage metering indicator and the indicators of the plurality of RPA environment templates, receive a user input indicating a selected RPA environment template and a user input indicating a desired provisioning lifespan;

in response to receiving the user inputs indicating the selected RPA environment template and provisioning lifespan, initiate an automatic provisioning of an RPA environment to a host platform, the RPA environment configured according to the selected RPA environment template and comprising a virtual machine (VM) and a platform-specific service used by the VM, wherein the VM is configured to execute an RPA robot mimicking an interaction between a human operator and a target software application; and in response to determining that the provisioning lifespan has expired, initiate a de-activation of the RPA environment.

2. The method of claim 1, wherein the host platform comprises an item selected from a group consisting of a cloud computing platform and an on-premises computer.

3. The method of claim 1, wherein provisioning the RPA environment comprises identifying the host platform according to the selected RPA environment template and instantiating the VM on the host platform.

4. The method of claim 1, wherein the selected RPA environment template comprises a memory image of the VM pre-loaded with the RPA robot and an instance of the target software application.

5. The method of claim 1, wherein the RPA environment further comprises another platform-specific service used by the VM, and wherein provisioning the RPA environment comprises:
identifying another host platform according to the selected RPA environment template; and
instantiating the other platform-specific service on the other host platform.

6. The method of claim 1, wherein the platform-specific service implements a database server communicatively coupled to the VM.

7. The method of claim 1, wherein the platform-specific service comprises a virtual network link connecting the VM to an RPA orchestrator configured to launch the RPA robot into execution.

8. The method of claim 7, wherein provisioning the RPA environment comprises:
identifying another host platform according to the selected RPA environment template; and
instantiating the RPA orchestrator on the other host platform.

9. The method of claim 8, wherein provisioning the RPA environment comprises:
identifying another host platform according to the selected RPA environment template; and
instantiating another VM on the other host platform, the other VM configured to execute another RPA robot, and wherein the RPA orchestrator is configured to launch the other RPA robot into execution.

10. The method of claim 1, wherein de-activating the RPA environment comprises transmitting a communication to the host platform, the communication selected from a group consisting of a command configured to terminate the VM and a command configured to terminate the platform-specific service.

11. The method of claim 1, wherein the usage metering indicator shows a current provisioning lifespan usage level as a fraction of a provisioning lifespan budget allocated to the selected RPA environment template.

12. The method of claim 1, wherein the available budget for the provisioning lifespan is further determined according to an identity of a user group having the user as a member.

13. The method of claim 1, further comprising employing the at least one hardware processor to display within the user interface an indicator of an amount of time left until an expiration of the provisioning lifespan.

14. The method of claim 1, wherein the plurality of RPA environment templates includes templates defined for a plurality of host platforms.

15. A computer system comprising at least one hardware processor configured to:
display to a user within a user interface a usage metering indicator indicative of an available budget for a provisioning lifespan for each of a plurality of pre-defined robotic process automation (RPA) environment templates, wherein a display size of at least part of the usage metering indicator is indicative of the available budget, each available budget determined according to a corresponding RPA environment template, wherein the user interface presents to the user for selection indicators of a plurality of pre-defined platform-specific RPA environment templates;

in response to displaying the usage metering indicator and the indicators of the plurality of RPA environment templates, receive a user input indicating a selected RPA environment template and a user input indicating a desired provisioning lifespan;

in response to receiving the user inputs indicating the selected RPA environment template and provisioning lifespan, initiate an automatic provisioning of an RPA environment to a host platform, the RPA environment configured according to the selected RPA environment template and comprising a virtual machine (VM) and a platform-specific service used by the VM, wherein the VM is configured to execute an RPA robot mimicking an interaction between a human operator and a target software application; and in response to determining that the provisioning lifespan has expired, initiate a de-activation of the RPA environment.

16. The computer system of claim 15, wherein the host platform comprises an item selected from a group consisting of a cloud computing platform and an on-premises computer.

17. The computer system of claim 15, wherein provisioning the RPA environment comprises identifying the host platform according to the selected RPA environment template and instantiating the VM on the host platform.

18. The computer system of claim 15, wherein the selected RPA environment template comprises a memory image of the VM pre-loaded with the RPA robot and an instance of the target software application.

19. The computer system of claim 15, wherein the RPA environment further comprises another platform-specific service used by the VM, and wherein provisioning the RPA environment comprises:
identifying another host platform according to the selected RPA environment template; and
instantiating the other platform-specific service on the other host platform.

20. The computer system of claim 15, wherein the platform-specific service implements a database server communicatively coupled to the VM.

21. The computer system of claim 15, wherein the platform-specific service comprises a virtual network link connecting the VM to an RPA orchestrator configured to launch the RPA robot into execution.

22. The computer system of claim 21, wherein provisioning the RPA environment comprises:
identifying another host platform according to the selected RPA environment template; and
instantiating the RPA orchestrator on the other host platform.

23. The computer system of claim 21, wherein provisioning the RPA environment comprises:
identifying another host platform according to the selected RPA environment template; and
instantiating another VM on the other host platform, the other VM configured to execute another RPA robot, and wherein the RPA orchestrator is configured to launch the other RPA robot into execution.

24. The computer system of claim 15, wherein de-activating the RPA environment comprises transmitting a communication to the host platform, the communication selected from a group consisting of a command configured to terminate the VM and a command configured to terminate the platform-specific service.

25. The computer system of claim 15, wherein the usage metering indicator shows a current provisioning lifespan usage level as a fraction of a provisioning lifespan budget allocated to the selected RPA environment template.

26. The computer system of claim 15, wherein the available budget for the provisioning lifespan is further determined according to an identity of a user group having the user as a member.

27. The computer system of claim 15, wherein the at least one hardware processor is further configured to display within the user interface an indicator of an amount of time left until an expiration of the provisioning lifespan.

28. The computer system of claim 15, wherein the plurality of RPA environment templates includes templates defined for a plurality of host platforms.

29. A non-transitory computer-readable medium storing instructions which, when executed by at least one hardware processor of a computer system, cause the computer system to:
display to a user within a user interface a usage metering indicator indicative of an available budget for a provisioning lifespan for each of a plurality of pre-defined robotic process automation (RPA) environment templates, wherein a display size of at least part of the usage metering indicator is indicative of the available budget, each available budget determined according to a corresponding RPA environment template, wherein the user interface presents to the user for selection indicators of a plurality of pre-defined platform-specific RPA environment templates;
in response to displaying the usage metering indicator and the indicators of the plurality of RPA environment templates, receive a user input indicating a selected robotic process automation (RPA) environment template and a user input indicating a desired provisioning lifespan;
in response to receiving the user inputs indicating the selected RPA environment template and provisioning lifespan, initiate an automatic provisioning of an RPA environment to a host platform, the RPA environment configured according to the selected RPA environment template and comprising a virtual machine (VM) and a platform-specific service used by the VM, wherein the VM is configured to execute an RPA robot mimicking an interaction between a human operator and a target software application; and
in response to determining that the provisioning lifespan has expired, initiate a de-activation of the RPA environment.

* * * * *